United States Patent
Carter et al.

(10) Patent No.: US 8,516,293 B2
(45) Date of Patent: Aug. 20, 2013

(54) SYSTEM AND METHOD FOR IMPLEMENTING A CLOUD COMPUTER

(75) Inventors: Stephen R. Carter, Spanish Fork, UT (US); Carolyn Bennion McClain, Springville, UT (US); Lloyd Leon Burch, Payson, UT (US)

(73) Assignee: Novell, Inc., Provo, UT (US)

( * ) Notice: Subject to any disclaimer, the term of this patent is extended or adjusted under 35 U.S.C. 154(b) by 917 days.

(21) Appl. No.: 12/612,925

(22) Filed: Nov. 5, 2009

(65) Prior Publication Data

US 2011/0107133 A1    May 5, 2011

(51) Int. Cl.
*G06F 1/04* (2006.01)

(52) U.S. Cl.
USPC .................................. 713/501; 713/600

(58) Field of Classification Search
USPC .......................... 713/500–503, 600
See application file for complete search history.

(56) References Cited

U.S. PATENT DOCUMENTS

| | | | |
|---|---|---|---|
| 5,428,738 A | 6/1995 | Carter et al. | |
| 5,623,647 A * | 4/1997 | Maitra | 713/501 |
| 5,787,175 A | 7/1998 | Carter | |
| 5,790,842 A * | 8/1998 | Charles et al. | 713/600 |
| 5,870,564 A | 2/1999 | Jensen et al. | |
| 5,878,419 A | 3/1999 | Carter | |
| 6,067,572 A | 5/2000 | Jensen et al. | |
| 6,108,619 A | 8/2000 | Carter et al. | |
| 6,119,230 A | 9/2000 | Carter | |
| 6,185,612 B1 | 2/2001 | Jensen et al. | |
| 6,219,652 B1 | 4/2001 | Carter et al. | |
| 6,275,819 B1 | 8/2001 | Carter | |
| 6,405,199 B1 | 6/2002 | Carter et al. | |
| 6,459,809 B1 | 10/2002 | Jensen et al. | |
| 6,601,171 B1 | 7/2003 | Carter et al. | |
| 6,622,253 B2 * | 9/2003 | Bacon | 713/322 |
| 6,647,408 B1 | 11/2003 | Ricart et al. | |
| 6,650,777 B1 | 11/2003 | Jensen et al. | |
| 6,697,497 B1 | 2/2004 | Jensen et al. | |
| 6,738,907 B1 | 5/2004 | Carter | |
| 6,742,035 B1 | 5/2004 | Zayas et al. | |
| 6,742,114 B1 | 5/2004 | Carter et al. | |
| 6,760,843 B1 | 7/2004 | Carter | |
| 6,772,214 B1 | 8/2004 | McClain et al. | |
| 6,826,557 B1 | 11/2004 | Carter et al. | |
| 6,862,606 B1 | 3/2005 | Major et al. | |
| 6,948,085 B2 * | 9/2005 | Albrecht et al. | 713/400 |
| 6,993,508 B1 | 1/2006 | Major et al. | |
| 7,028,211 B2 * | 4/2006 | Mantani | 713/600 |
| 7,043,555 B1 | 5/2006 | McClain et al. | |
| 7,152,031 B1 | 12/2006 | Jensen et al. | |
| 7,177,922 B1 | 2/2007 | Carter et al. | |
| 7,185,047 B1 | 2/2007 | Bate et al. | |
| 7,197,451 B1 | 3/2007 | Carter et al. | |
| 7,286,977 B1 | 10/2007 | Carter et al. | |

(Continued)

*Primary Examiner* — Paul R Myers
*Assistant Examiner* — Trisha Vu
(74) *Attorney, Agent, or Firm* — Haynes and Boone, LLP

(57) ABSTRACT

One embodiment is a clocking system for a computing environment. The system comprises a first set of processes executing in a first computing environment; a first local clock mechanism associated with the first set of processes; and a first communications channel for connecting the first local clock mechanism with the first set of processes. The first local clock mechanism stores clock rates of the first set of processes, wherein each clock rate is specified by function and source and destination combination, the first local clock mechanism further coordinating the clock speeds of the first set of processes as necessary.

20 Claims, 2 Drawing Sheets

(56) References Cited

U.S. PATENT DOCUMENTS

| | | |
|---|---|---|
| 7,299,493 B1 | 11/2007 | Burch et al. |
| 7,316,027 B2 | 1/2008 | Burch et al. |
| 7,334,257 B1 | 2/2008 | Ebrahimi et al. |
| 7,340,629 B2 * | 3/2008 | Kates et al. .................. 713/400 |
| 7,356,726 B2 * | 4/2008 | Shimoyama et al. ......... 713/600 |
| 7,356,819 B1 | 4/2008 | Ricart et al. |
| 7,363,577 B2 | 4/2008 | Kinser et al. |
| 7,376,134 B2 | 5/2008 | Carter et al. |
| 7,386,514 B2 | 6/2008 | Major et al. |
| 7,389,225 B1 | 6/2008 | Jensen et al. |
| 7,426,516 B1 | 9/2008 | Ackerman et al. |
| 7,467,415 B2 | 12/2008 | Carter |
| 7,475,008 B2 | 1/2009 | Jensen et al. |
| 7,505,972 B1 | 3/2009 | Wootten et al. |
| 7,506,055 B2 | 3/2009 | McClain et al. |
| 7,552,468 B2 | 6/2009 | Burch et al. |
| 7,562,011 B2 | 7/2009 | Carter et al. |
| 7,624,295 B2 * | 11/2009 | Taketoshi et al. ............. 713/500 |
| 7,742,544 B2 * | 6/2010 | Schumann .................... 375/316 |
| 7,895,461 B2 * | 2/2011 | Lagnado et al. .............. 713/501 |
| 7,945,803 B2 * | 5/2011 | Jones et al. ................... 713/501 |
| 2008/0244575 A1 | 10/2008 | Carter et al. |
| 2008/0256535 A1 | 10/2008 | Carter et al. |
| 2008/0256538 A1 | 10/2008 | Carter et al. |
| 2008/0307415 A1 | 12/2008 | Carter |
| 2009/0217277 A1 * | 8/2009 | Johnson et al. ............... 718/102 |
| 2009/0240973 A1 * | 9/2009 | Muraki ......................... 713/503 |
| 2009/0248900 A1 * | 10/2009 | Marucheck et al. .......... 709/248 |

\* cited by examiner

SYSTEM AND METHOD FOR IMPLEMENTING A CLOUD COMPUTER

CROSS-REFERENCE TO RELATED APPLICATIONS

This application is related to the following commonly-assigned, co-pending applications, each of which is also incorporated herein by reference in its entirety:
1. U.S. patent application Ser. No. 12/612,807 filed on Nov. 5, 2009, now U.S. Pat. No. 8,065,395 issued on Nov. 22, 2011;
2. U.S. patent application Ser. No. 12/612,818 filed on Nov. 5, 2009;
3. U.S. patent application Ser. No. 12/612,834 filed on Nov. 5, 2009;
4. U.S. patent application Ser. No. 12/612,841 filed on Nov. 5, 2009;
5. U.S. patent application Ser. No. 12/612,882 filed on Nov. 5, 2009;
6. U.S. patent application Ser. No. 12/612,895 filed on Nov. 5, 2009;
7. U.S. patent application Ser. No. 12/612,903 filed on Nov. 5, 2009;
8. U.S. patent application Ser. No. 12/613,077 filed on Nov. 5, 2009;
9. U.S. patent application Ser. No. 12/613,098 filed on Nov. 5, 2009;
10. U.S. patent application Ser. No. 12/613,112 filed on Nov. 5, 2009; and
11. U.S. patent application Ser. No. 12/197,833.

BACKGROUND

Cloud computing is a type of computing in which dynamically scalable and typically virtualized resources are provided as services via the Internet. As a result, users need not, and typically do not, possess knowledge of, expertise in, or control over the technology and/or infrastructure implemented in the cloud. Cloud computing generally incorporates infrastructure as a service ("IaaS"), platform as a service ("PaaS"), and/or software as a service ("SaaS"). In a typical embodiment, cloud computing services provide common applications online, which applications are accessed using a web browser and the software and data for which are stored on servers comprising the cloud.

Cloud computing customers typically do not own or possess the physical infrastructure that hosts their software platform; rather, the infrastructure is leased in some manner from a third-party provider. Cloud computing customers can avoid capital expenditures by paying a provider for only what they use on a utility, or resources consumed, basis or a subscription, or time-based, basis, for example. Sharing computing power and/or storage capacity among multiple lessees has many advantages, including improved utilization rates and an increase in overall computer usage.

With the recent advances in network bandwidth, Internet and cloud computing environment assets, or resources, are becoming more and more accessible and will in all likelihood eventually possess greater capabilities than desktop systems. With bandwidths of over 10 Gb per second, assets deployed in a cloud computing environment and on the Internet will be available at speeds rivaling those of local desktop and laptop systems. During the early days of computer development, computing engineers implemented "handshakes" between the various components of a computing system. For example, memory cards used a positive handshake to indicate when addresses and data were safe to read and write on the address and data buses. As technology has matured, handshakes have been set aside in favor of clocking systems, in which it is safe to assume that all data and addresses have settled upon expiration of a predetermined number of clock intervals.

SUMMARY

One embodiment is a clocking system for a computing environment. The system comprises a first set of processes executing in a first computing environment; a first local clock mechanism associated with the first set of processes; and a first communications channel for connecting the first local clock mechanism with the first set of processes. The first local clock mechanism stores clock rates of the first set of processes, wherein each clock rate is specified by function and source and destination combination, the first local clock mechanism further coordinating the clock speeds of the first set of processes as necessary.

DETAILED DESCRIPTION

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

As shown and described herein, it is a goal of one embodiment to organize Internet and cloud computing resources such that, instead of using a handshake type of protocol (such as TCP/IP) to effect the transfer of information and change of computing states, a clocking mechanism can be used. Use of such a clocking mechanism will increase the speed and stability of cloud computing and Internet access. Using the embodiments described herein, it is not necessary for a single, lowest common denominator (in terms of speed), clock rate to be deployed throughout the cloud or the Internet; instead, multiple clock rates can be deployed so that faster areas of the cloud or Internet. Likewise, as more bandwidth, computing power, and storage density/speed becomes available, Internet and cloud resources will be more favorably viewed as mere extensions to a desktop system, thus enhancing the advantages of the embodiments described herein.

The embodiments described herein provide a mechanism for allowing cloud and Internet resources to be accessed without the requirement of protocol handshake. The embodiments described herein further provide a mechanism for allowing access to Internet and cloud resources in a way that will allow the results of computing activities to be more readily available to other and possibly external processes.

Figure 1:
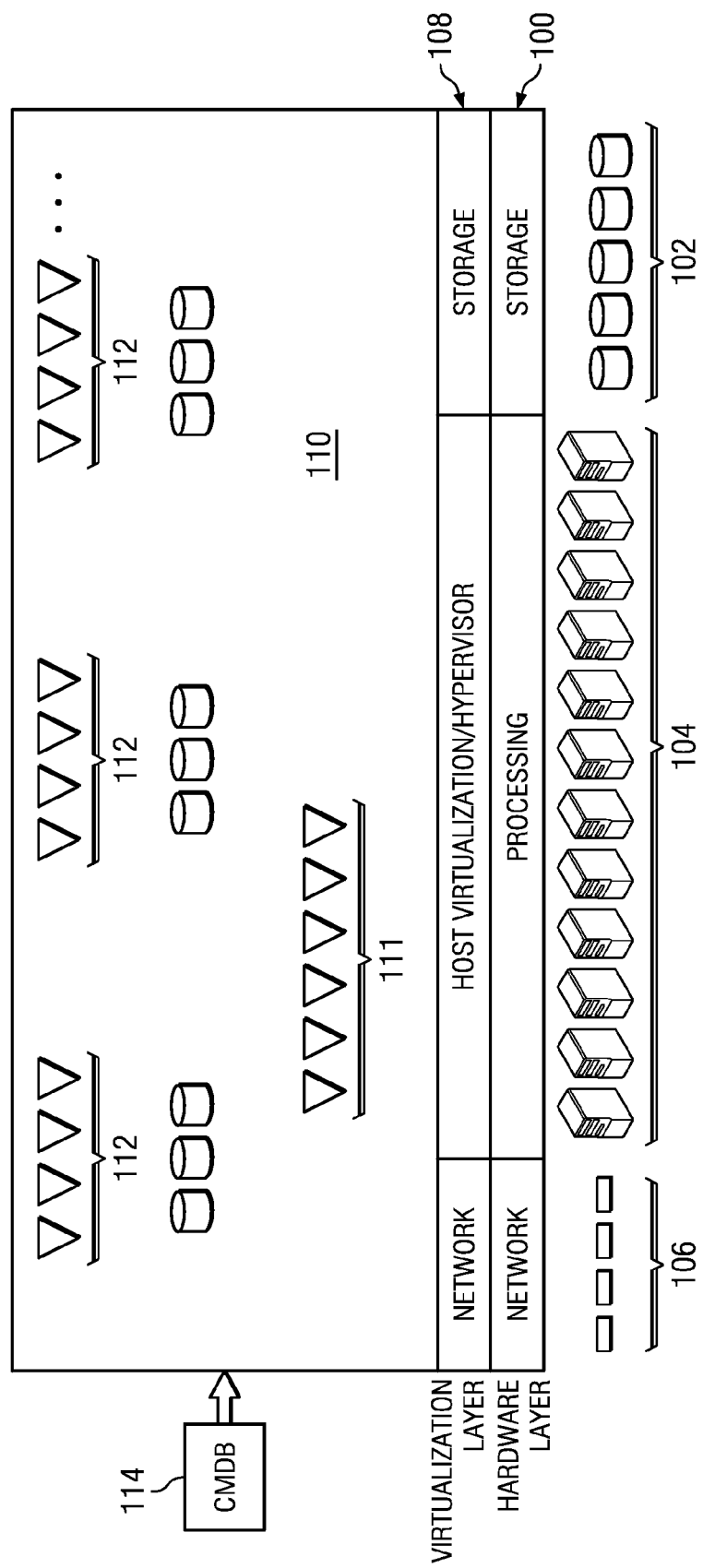
FIG. 1 illustrates an exemplary IaaS cloud structure such as may be implemented in one embodiment.

FIG. 1 illustrates an exemplary IaaS cloud structure. As shown in FIG. 1, the cloud structure includes a hardware layer 100 comprising storage assets 102, processing assets 104, and network assets 106. To facilitate usefulness of the cloud to a variety of enterprises, workloads are sponsored in the cloud as virtual machines possibly accessing virtualized storage and/or virtualized networks. This is accomplished via a virtualization layer 108. Thus, the hardware layer 100 is insulated from the actual workloads to be sponsored in the cloud at a layer 110 by the virtualization layer 108 hardware, storage, and networking so that the operating system selected by the enterprise can be sponsored on whatever hardware the cloud provider makes available. Having established the hardware and virtualization layers 100, 108, the assets 102, 104, and 106 are available in a standardized way to workloads hosted in the workload layer 110, which is the layer the customer typically views as the "cloud". It will be recognized that some of the workloads sponsored in the cloud, specifically, workloads 111, are workloads that are germane to the operation of the cloud and may consist of monitoring processes for enabling the cloud provider to monitor the health of the cloud, management processes to enable the cloud provider to ensure that service-level agreements are enforced, and so on.

Enterprises using the cloud are represented by virtualization processes and storage shown as workloads 112. These processes are typically started by an enterprise via a cloud portal or API utilized by administrative personnel or processes running at the enterprise or in the cloud. A typical cloud provider may be using standard ITIL practices and may utilize a configuration management database ("CMDB") 114, which affects the entire cloud infrastructure and which describes the practice and policies used for instantiating virtualized workloads and storage.

As previously noted, the embodiments described herein allow for cloud computing and Internet resources to be implemented and utilized in a clock-based manner rather than using handshakes via protocols to determine state change. As such resources become faster, the advantages of the embodiments described herein become more pronounced. Moreover, virtualization is only one manner in which resources may be provided in a cloud; another manner is through a hosted environment such as Salesforce.com. Accordingly, the embodiments described herein could be employed in environments other than virtualized environments, including, but not limited to, a traditional data center or hosted environment.

Figure 2:
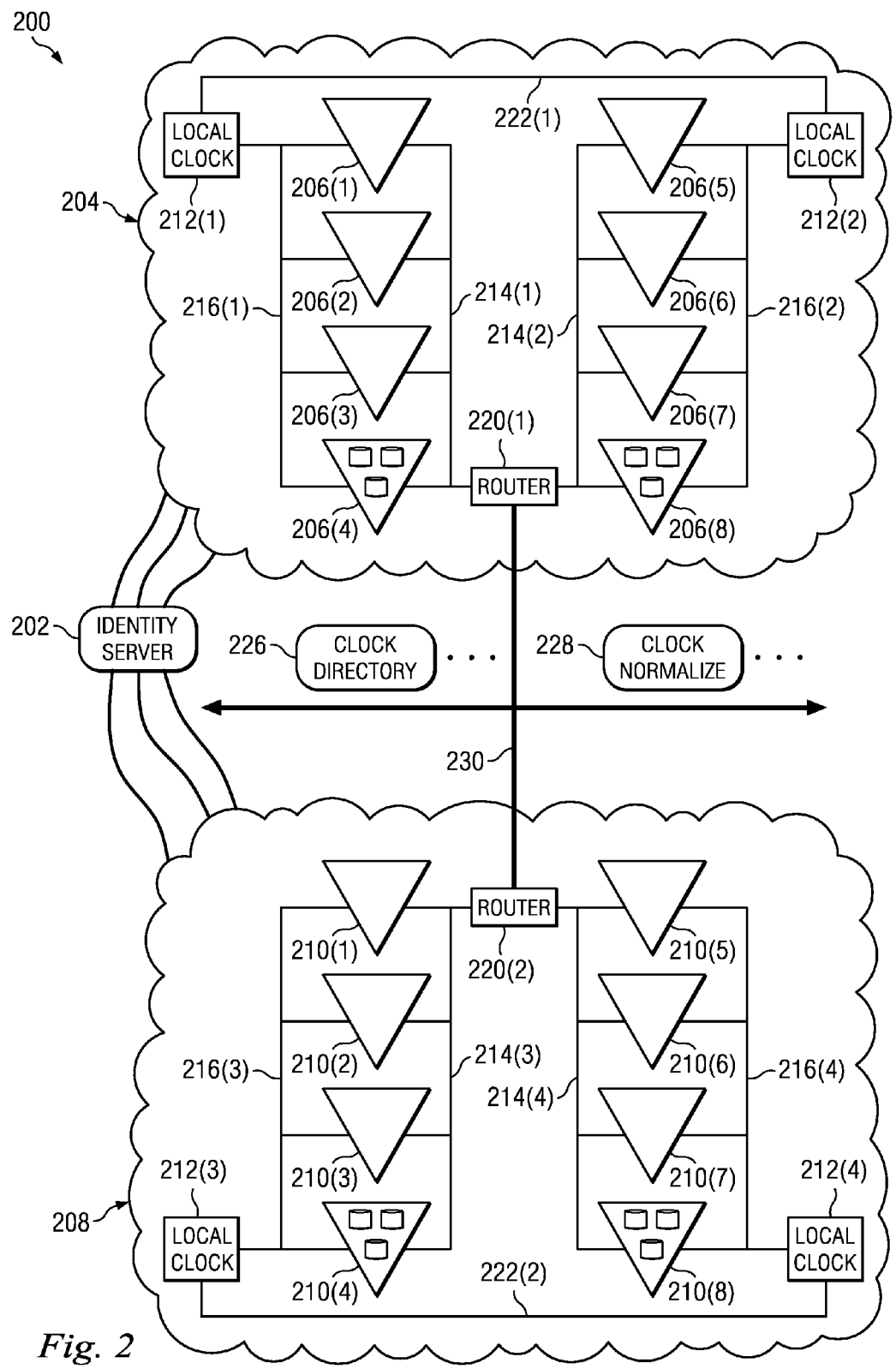
FIG. 2 is a flow diagram of one embodiment of clocking system for a computing environment.

FIG. 2 illustrates is a flow diagram of one embodiment 200 of a clocking system for a computing environment. As shown in FIG. 2, an identity server ("IS") 202 provides identity and authentication services as per stipulated policy and is implemented in a manner that is known in the art. For example, in one embodiment, the IS 202 is implemented as described in U.S. Pat. Nos. 7,299,493, 7,316,027, and 7,552,468. In the illustrated embodiment, the IS 202 provides identity data to all processes, mechanisms, storage, etc., (hereinafter collectively referred to as "processes") that comprise assets, or resources, in a public cloud, in the data center, or in a private cloud.

For example, a cloud 204 includes a plurality of processes 206(1)-206(8), while a cloud 208 includes a plurality of processes 210(1)-210(8). Each of the processes 206(1)-206(8), 210(1)-210(8), has an identity that is separate and distinct from any of the other processes. Likewise, if the process 206(1) were to be re-instantiated (e.g., cloned for load-balancing), then the identity of the original process would be separate and distinct from that of the re-instantiation thereof. While this is the most profitable way for the embodiment to operate, it is not necessary for all processes to have a unique identity provided by the IS 202. Some identities can be derived through mechanisms such as static declaration, for example. The embodiments described herein provide for processes, such as the processes 206(1)-206(8) and 210(1)-210(8), to operate autonomously without a synchronized clock or positive handshake.

In one embodiment, the clock rates of the processes 206(1)-206(8), 210(1)-210(8), are known and are registered in a respective one of several local clock mechanisms 212(1)-212(4). For example, assuming that the process 206(1) provides LDAP functionality, the number of clock ticks necessary for the process to perform each LDAP function would be registered with the local clock mechanism 212(1). This allows for a bind function to take a different number of clock ticks from a read attribute, for example. The location of an LDAP store (not shown) that the process 206(1) accesses plays a significant role in the number of clock ticks (or the amount of time) that a process implemented by the process 206(2) takes. This is also true if the process 206(1) accesses multiple LDAP stores, one of which is very fast and another of which is very slow. In such a case, the local clock mechanism 212(1) receives a definition from the process 206(1) that indicates the number of clock ticks that it takes to do a bind that would be different for the fast LDAP store versus the slow LDAP store. This is analogous to a situation in which a computer instruction, such as move, in which the number of clock ticks for a register to register move is different from that of a register to memory move or a memory to memory move. In this manner, a generic command such as "bind" is augmented by the type of storage that is being used (e.g., a slow LDAP repository versus a fast LDAP repository). If a process is not able to participate in the clocking mechanism it may declare itself a "handshake" process, which results in its falling back to use of prior art (e.g., handshake) mechanisms.

Accordingly, one embodiment provides for each of the processes 206(1)-206(8), 210(1)-210(8), to have a registered set of functions, as well as a registered set of sources and destinations, such that the number of clock ticks required to perform the function against the source and destination can be made known to other processes in the cloud 204, 208.

An embodiment also provides for synchronization of the clocks in the various processes and/or other mechanisms. This can be accomplished via standard communications links and protocols, designated in FIG. 2 by reference numerals 214(1)-214(4), or via separate communications channels, designated in FIG. 2 by reference numerals 216(1)-216(4). Regardless of the communications channel employed, each of the local clock mechanisms 212(1)-212(4) is capable of using one of the designated channels to coordinate the clock speeds of the processes 204(1)-204(8), 208(1)-208(8). It should be noted that each of the processes 204(1)-204(8), 208(1)-208(8) is autonomous and runs at its own speed; therefore, the local clock mechanisms 212(1)-212(4) will regularly coordinate with respective ones of the processes so that the relative timing of the clocks therebetween can be made known. Once clock cycle times are understood, a process, such as the process 206(2), can perform a function against another process, for example, the process 206(1), without regard to protocol handshakes. This is similar to modern day computers wherein the CPU accesses an L1 or L2 cache at a given clock rate because the system has been constructed so that the clock rates are understood and the data will be ready when accessed.

As with modern computer systems, if an access by the process 206(2) against the process 206(1) is not satisfied properly, the process 206(2) will reissue the request. This is similar to receiving a parity error against memory in a modern computer system wherein the modern computer system attempts to access the memory again and after so many tries will then issue an error stating that the computer system was no longer functioning appropriately. In the case of the embodiments described herein, each of the processes registered with the local clock mechanisms 212(1)-212(4) will have a clock rate at the declared cycle time for each function and source and destination combination such that the other processes can rely upon the process to provide the service in a timely manner. In another embodiment, a process may be declared incapable of clock function, in which case it would fall back to a handshake mode in accordance with the prior art.

It should be noted that each of the local clock mechanisms 212(1)-212(4) periodically receives reports from registered processes declaring new or changed clock rates because of new functions, new sources, new destinations, or a change in operational characteristics. The embodiments also provide for the local clock mechanisms 212(1)-212(4) to initiate an interrogation rather than wait for a report. As shown in FIG. 2, each of the local clock mechanisms 212(1)-212(4) communicates via the communications channels 216(1)-216(4) to make known to the respective processes 206(1)-206(8), 210(1)-210(8) the various clock rates for various functions and associated sources and destinations and the processes communicate via the communications channels 216(1)-216(4) (e.g., using traditional Internet protocols) through routers 220(1), 220(2). The embodiments also provide for the local clock mechanisms 212(1) and 212(2) and the local clock mechanisms 212(3) and 212(4) to communicate with one another via channels 222(1), 222(2), respectively, so that different parts of the clouds 204, 208, are able to use the services throughout the respective cloud without having to be part of the same communications channel 216(1)-216(4).

In one embodiment, the communications channels 216(1)-216(4) are high-speed network communications channels that allow for very responsive report gathering or interrogation of clock rate so that the registry of clock rates against functions and sources and destinations can be kept up-to-date in a very timely manner. In this case, it is not reasonable to have all of the communications channels 216(1)-216(4) connected together because of the expense of the very high speed activity. Accordingly, separate communications channels 222(1), 222(2) (which may also be high-speed connections or standard Internet protocol connections) are used.

In the cloud 202, processes 206(1)-206(4) interact via the communications channel 216(1) and processes 206(5)-206(8) interact via the communications channel 216(2). Though all of the mechanisms 206(1)-206(8) use the same router 220(1), the clock channels 216(1) and 216(2) are separate. In one embodiment, the clock channels could be the same, either because the high-speed buses share or the processes 206(1)-206(4), 210(1)-210(4) use standard Internet protocols to access the respective one of the local clock mechanisms 212(1)-212(4). In another embodiment, the high speed channels 216(1), 216(2), are separate and the local clock mechanisms 212(1), 212(2), communicate via the channel 222(1), so that the processes available that are registered with each local clock mechanisms 212(1), 212(2) are made known throughout the cloud 204. In this manner, the process 206(2), for example, could access the process 206(5) to obtain services.

One embodiment also provides for multiple clouds, such as the clouds 204, 208, to be able to operate in the same clocked mechanism such that processes 206(1)-206(8) in the cloud 204 can access processes 210(1)-210(8) in the cloud 206 and vice versa. In this embodiment, a clock directory 226 comprises a directory of all pertinent local clocks 212(1)-212(4). The various functions, sources, destinations, and their clock rate are publicized across the cloud boundaries. In one embodiment, a clock normalizing function 228 normalizes and takes into account the extra time in clock ticks needed to access any process 204(1)-204(8) from a process 210(1)-210(8). The clock normalization function 228 is updated regularly to take into account the changes of a connectivity channel at 230.

In one embodiment, the clock normalization function 228 is updated regularly so that changes to various cloud infrastructures and intra-cloud infrastructures can be kept up to date and the clock ticks necessary to perform a function given the source and the destination can be maintained at an optimum level. For example, the channel 230 may be upgraded to a higher bandwidth throughput indication channel, which would enable the number of clock ticks needed to perform a cross-cloud function call to be reduced. Such changes to inter- and intra-cloud infrastructure can be automatically taken into account as infrastructure increases, load on infrastructure decreases, or load on infrastructure increases.

In one embodiment, the clock normalization function 228 allows for the rapid conversion of different clock rate metrics. For example, an older system may be measuring clock ticks in milliseconds while a newer one may be measuring in nanoseconds. In this case, the older system that may not be able to utilize the second clock tick metric, in which case the clock normalization function 228 would make the appropriate change so that the correct results are obtained when accessing the older system. Additionally, the clock normalization function 228 may also provide for the mixing of a clock tick metric that used time (e.g., milliseconds) and another that may utilize some other metric such as some arbitrary clock tick metric that does not use time.

It will be recognized that various ones of the elements, mechanisms, and/or modules described herein may be implemented using one or more general purpose computers or portions thereof executing software applications designed to perform the functions described or using one or more special purpose computers or portions thereof configured to perform the functions described. The software applications may comprise computer-executable instructions stored on computer-readable media. Additionally, repositories described herein may be implemented using databases or other appropriate storage media.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A clocking system for a computing environment, the system comprising:
   a first set of processes executing in a first computing environment, the first computing environment including a first router for enabling communication with a second computing environment;
   a first local clock mechanism associated with the first set of processes;
   a first communications channel for connecting the first local clock mechanism with the first set of processes;
   wherein the first local clock mechanism stores clock rates of the first set of processes, wherein each clock rate is specified by at least one of function, source, and destination, the first local clock mechanism further coordinating the clock speeds of the first set of processes as necessary.

2. The system of claim 1 further comprising:
   a second set of processes executing in the first computing environment;
   a second local clock mechanism associated with the second set of processes;
   a second communications channel for connecting the second local clock mechanism with the second set of processes;
   and a third communications channel for connecting the first and second clock mechanisms;
   wherein the second local clock mechanism stores clock rates of the second set of processes, wherein each clock rate is specified by function and source and destination combination, the second local clock mechanism further coordinating the clock speeds of the second set of processes as necessary.

3. The system of claim 1 further comprising an identity server ("IS") for providing identity and authentication services with respect to the first set of processes.

4. The system of claim 1 further comprising:
   a second set of processes executing in the second computing environment;
   a second local clock mechanism associated with the second set of processes; and
   a second router connected to the first router and associated with the second computing environment;
   wherein the second local clock mechanism stores clock rates of the second set of processes, wherein each clock rate is specified by function and source and destination combination, the second local clock mechanism further coordinating the clock speeds of the second set of processes as necessary; and
   wherein the first and second routers enable communications between a process of the first set of processes and a process of the second set of processes.

5. The system of claim 4 further comprising a clock directory connected to the first and second routers, the clock directory comprising a directory of all clock rates stored in the first and second local clock mechanisms.

6. The system of claim 4 further comprising a clock normalization circuit connected to the first and second routers for normalizing the clock rates stored in the first and second local clock mechanisms by taking into account a speed of the connection between the first and second routers.

7. The system of claim 1 wherein the first computing environment comprises the Internet.

8. The system of claim 1 wherein the first computing environment comprises a cloud computing environment.

9. The system of claim 1 wherein the first computing environment comprises a hosted environment.

10. The system of claim 1 wherein when a process of the first set of processes does not participate in the first clock mechanism, the process utilizes a different mechanism.

11. A clocking system for a computing environment, the system comprising:
   a first set of processes executing in a first computing environment;
   a first clock mechanism connected to the first set of processes for registering respective clock rates of the first set of processes, wherein each clock rate is specified by function and source and destination combination, and for coordinating the clock speeds of the first set of processes as necessary;
   a second set of processes executing in the first computing environment;
   a second clock mechanism connected to the second set of processes for registering respective clock rates of the second set of processes, wherein each clock rate is specified by function and source and destination combination, and for coordinating the clock speeds of the second set of processes as necessary;
   and a first communications channel for enabling communication between the first clock mechanism connected to the first set of processes and the second clock mechanism connected to the second set of processes,
   wherein when a process of the first set of processes does not participate in the first clock mechanism, the process utilizes a different mechanism.

12. The system of claim 11 further comprising an identity server ("IS") for providing identity and authentication services with respect to the first and second sets of processes.

13. The system of claim 11 further comprising:
   a third set of processes executing in a second computing environment;
   a third clock mechanism connected to the third set of processes for registering respective clock rates of the third set of processes, wherein each clock rate is specified by function and source and destination combination, and for coordinating the clock speeds of the third set of processes as necessary;
   a second communications channel for enabling communications between a process of the first and second sets of processes and a process of the third set of processes.

14. The system of claim 13 further comprising a clock directory for storing a directory of all clock rates stored in all of the clock mechanisms.

15. The system of claim 13 further comprising a clock normalizer for normalizing the clock rates stored in all of the clock mechanisms by taking into account a speed of the second communications channel for enabling communications between a process of the first and second sets of processes and a process of the third set of processes.

16. The system of claim 13 wherein the first computing environment and the second computing environment each comprise a computing environment selected from a group consisting of the Internet, a cloud computing environment, and a hosted environment.

17. A method of providing a clocking system in a computing environment, the method comprising:
   registering in a first local clock mechanism respective clock rates of a first set of processes executing in a first computing environment, wherein each clock rate is specified by function and source and destination combination, and for coordinating the clock speeds of the first set of processes as necessary;
   registering in a second clock mechanism respective clock rates of a second set of processes executing in the first computing environment, wherein each clock rate is specified by function and source and destination combination, and for coordinating the clock speeds of the second set of processes as necessary;

providing means for enabling communication between the first and second clock mechanisms;

registering in a third local clock mechanism respective clock rates of a third set of processes executing in a second computing environment, wherein each clock rate is specified by function and source and destination combination, and for coordinating the clock speeds of the third set of processes as necessary; and enabling communications between a process of the first and second sets of processes and a process of the third set of processes.

18. The method of claim 17 further comprising providing identity and authentication services with respect to the first and second sets of processes.

19. The method of claim 17 further comprising maintaining a directory of all clock rates stored in the first, second, and third local clock mechanisms.

20. The method of claim 17 further comprising normalizing the clock rates stored in the first, second, and third local clock mechanisms by taking into account a speed of the means for enabling communications between a process of the first and second sets of processes and a process of the third set of processes.

* * * * *